May 24, 1949. W. H. DOHERTY 2,471,264
RADIO OBJECT LOCATION SYSTEM
Filed Jan. 1, 1945 2 Sheets-Sheet 1
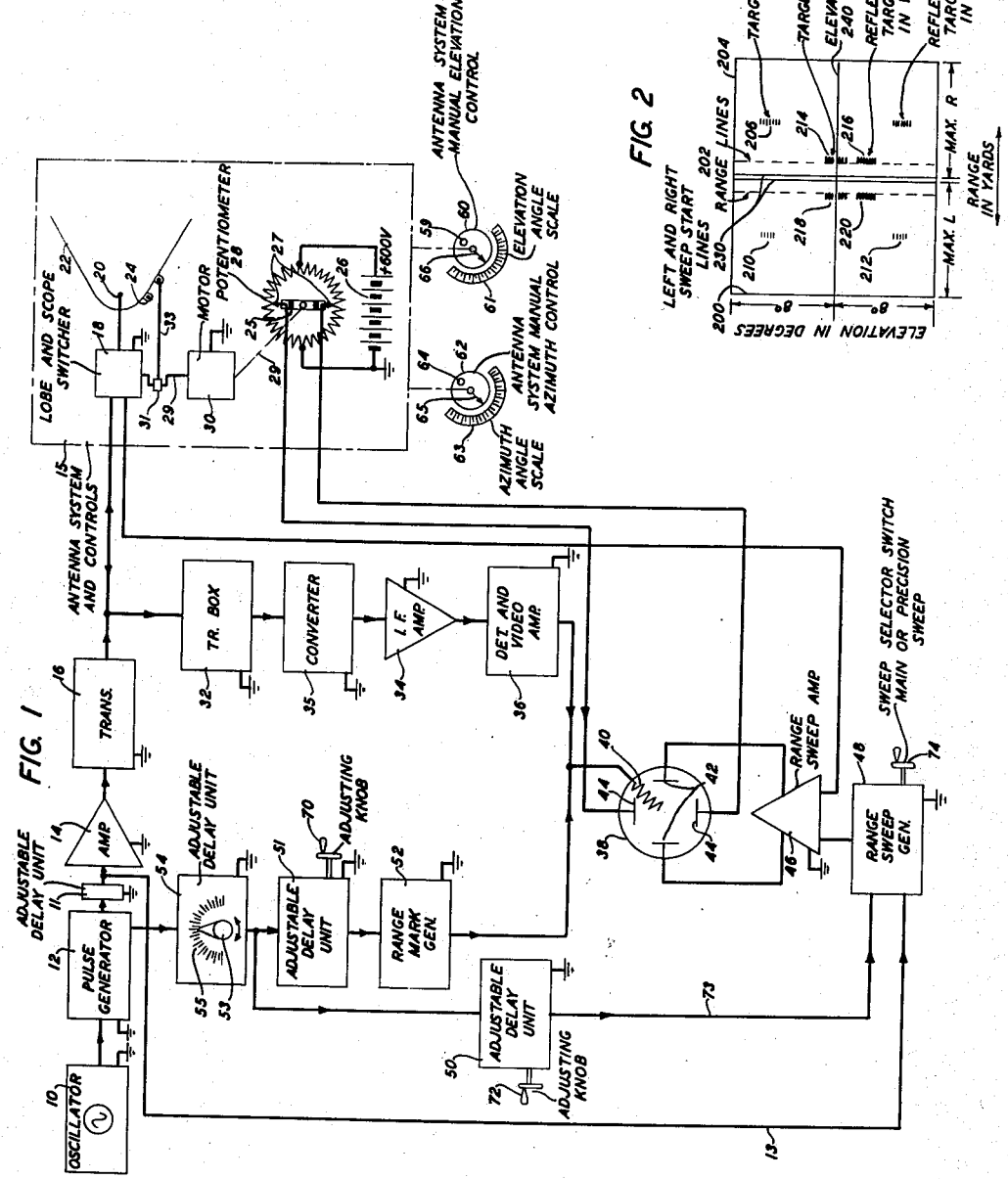
INVENTOR
W. H. DOHERTY
BY
H. O. Wright
ATTORNEY May 24, 1949.  W. H. DOHERTY  2,471,264
RADIO OBJECT LOCATION SYSTEM
Filed Jan. 1, 1945  2 Sheets-Sheet 2
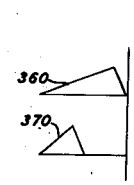
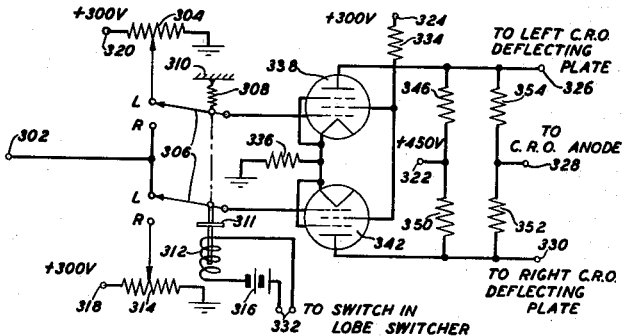
FIG. 3
FIG. 4
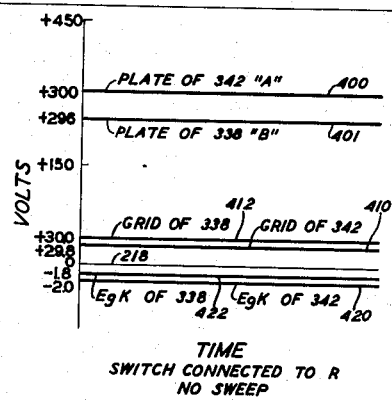
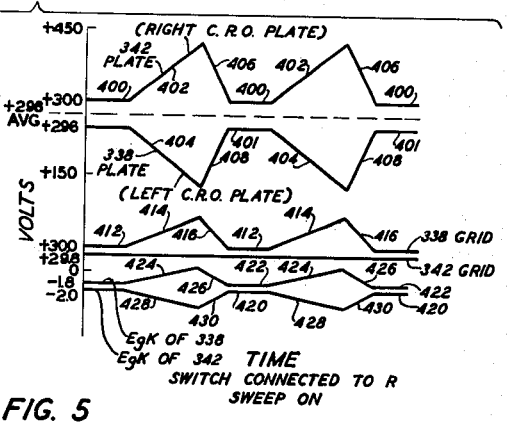
FIG. 5
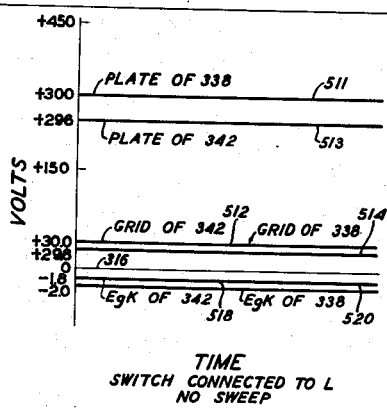
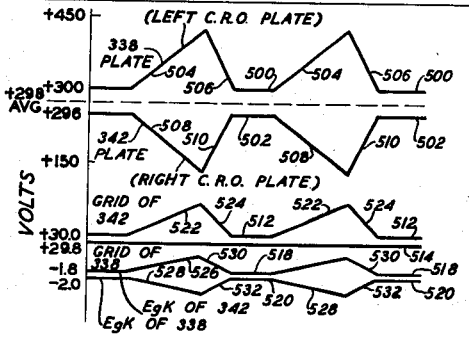
INVENTOR
W. H. DOHERTY
BY
H. O. Wright
ATTORNEY Patented May 24, 1949

2,471,264

UNITED STATES PATENT OFFICE 2,471,264

RADIO OBJECT LOCATION SYSTEM

William H. Doherty, Morristown, N. J., assignor to Bell Telephone Laboratories, Incorporated, New York, N. Y., a corporation of New York Application January 1, 1945, Serial No. 570,939

4 Claims. (Cl. 343—11)

This invention relates to improved arrangements for use in radars. More specifically, it relates to improved combinations of exploratory wave scanning arrangements and data presentation arrangements for use in radars which expedite the processes of accurately finding and following azimuth and elevation angles and the range of specific reflecting objects or targets, particularly aircraft at short range and low elevation within the area being explored by the radar system.

In the use of radar systems for searchlight pointing, gun pointing and fire control purposes, it has been found convenient to divide the process of aligning the radar upon a specific target and maintaining the alignment with a selected mobile target into three operations; namely, manipulation of range controls, manipulation of train, or azimuth, controls, and manipulation of elevation controls, and to assign each operation to a separate operator.

In order to avoid possible confusion between the selected target and one or more other objects at approximately the same azimuth and elevation angles, but at different range, it has further been customary to include in the range control system of the radar, a range "gate" circuit which unblanks the train and elevation indicating circuits only during the instants at which reflected pulses are received from the selected target. In such systems, the range operator must first align the range "gate" with the selected target before the other operators can start to bring the system into alignment in azimuth and elevation with the target so selected.

The above described arrangements are admirably well adapted for use with distant targets or even with slow moving targets at moderate range especially with systems having broad antenna field patterns. However, for use at short range against hostile aircraft approaching at speeds in the order of hundreds of miles per hour, the delay of even a fraction of a second, necessitated by the required setting of the range gate before the train and elevation operators can begin to align with the target, may prove disastrous.

A primary object of the invention is, therefore, to provide means whereby range, train, and elevation operators may all start immediately to effect the alignment of the radar with any specific target without the necessity of waiting for the range operator to align a range gate with the specific selected target.

A further difficulty is frequently encountered with ship-borne or coastal defense radars of the prior art in attempting to obtain the true elevation of aircraft flying relatively close to the surface of the water in that the exploratory beam has frequently been made relatively broad (or of wide angle) in the vertical plane, and hence, in addition to the reflections received directly from the aircraft, a second set of reflections returning from the aircraft after reflection from the surface of the water are received, i. e., the radar in effect "sees" simultaneously an "image" of the aircraft in the water as well as the aircraft itself. These two "reflections," one directly from the aircraft and the other from its "image," have a tendency to combine in the usual types of prior art radars and give an apparent elevation between the true elevation of the aircraft and the elevation of its "image" in the water so that the elevation angle provided by the radar for fire control is apt to be too small. The same difficulty may also be encountered where land surfaces having highly reflective properties are present and the problem is that of detecting low-flying aircraft.

A further object of the arrangements of the present invention is, therefore, to provide a type of radar system for use on naval vessels or at coastal defense installations which will give accurate and dependable elevation angle indications of aircraft approaching at relatively low elevation angles.

In general, a radar, to be effective for anti-aircraft fire control purposes, must scan or otherwise cover an appreciable angle in both azimuth and elevation so that it will be readily possible to follow rapidly moving targets without losing them frequently. Convenient radar antenna scanning arrangements known in the art permit rapid scanning to be effected in one plane only, so that scanning in the second plane must be at a relatively much slower rate. Also many antenna arrangements of convenient bulk and dimensions will provide an exploratory energy beam which is extremely sharp (or of small angular spread) in one plane but appreciably broader in the plane at right angles thereto.

To meet particular demands, such as, for example, those of anti-aircraft radar service on naval vessels, therefore, the present invention prescribes the use of rapid scanning in the vertical plane with an exploratory beam which is extremely sharp (or of narrow angle) in the vertical plane, so that the aircraft and its reflection or image in the water can be readily and clearly distinguished from each other. A relatively much slower scan in azimuth will then not be seriously objectionable and can be entirely adequate for following all normal changes in the azimuth angle of an aircraft as it approaches. Since the desired accuracy in the azimuth angle indication can, as will presently appear, be readily obtained by use of a modification of the well-known method commonly designated as "lobe-switching," a somewhat broader scanning beam in the azimuth plane will have advantages, in that reflections will be received from objects within the somewhat broader azimuth range thus afforded.

Furthermore, the systems of the invention include, in combination with the antenna system having the above described characteristics, means for portraying the radar indications of aircraft so that adjustments of the range, azimuth, and elevation controls of the radar to select a particular target can readily be effected simultaneously by the several operators normally employed, with no mutual interference. With systems of the invention, a further advantage is that a single type of indicator and electrical indicating circuit may be used by all three operators whereas prior systems at all comparable with those of this invention have required at least two different types of indicators and associated indicating circuits for the several operators.

The principles and additional objects of the invention will become more readily apparent during the course of the following detailed description of illustrative embodiments of the various features of the invention shown in the accompanying drawings in which:

Fig. 1 shows, in block schematic diagram form, a simple arrangement of a radar system suitable for practicing the invention;

Fig. 2 illustrates the type of pattern provided by the indicator associated with the system of Fig. 1;

Fig. 3 shows, in electrical schematic form, a range-sweep amplifier suitable for use with systems of the invention; and Figs. 4 and 5 show voltage wave diagrams illustrative of the operation of the amplifier of Fig. 3.

In more detail in the block schematic of Fig. 1, oscillator 10 provides a simple sine wave having a frequency corresponding to the number of pulses it is desired to transmit each second.

The maximum permissible pulse rate is, of course, determined by the time interval required for a pulse to travel to an object at maximum range and to return by reflection to the radar system, added to whatever time interval may be required to restore the several apparatus units to the condition in which they will be prepared to repeat their respective functions upon the emission of the next pulse. Usually, a much lower pulsing rate than the maximum permissible is employed, since the useful life of the active elements of the system can be substantially increased by reducing the pulsing rate.

For routine searching operations a pulsing rate as low as a few hundred pulses per second is sometimes employed, but for precise detecting and ranging purposes, especially with respect to small rapidly moving objects, such as aircraft, pulsing rates between 800 to 4000 pulses per second are usually employed. Since systems of the present invention are primarily intended for detecting and ranging in connection with aircraft at relatively short range, they will normally employ pulsing rates of a thousand or more per second.

Pulse generator 12 provides a pulse for each cycle of the sine wave furnished by oscillator 10. Generator 12 can be of any of the several forms well-known to those skilled in the art and should preferably generate extremely short pulses of substantially square-topped contour. Modern radar systems employ square-topped pulses of from a small fraction of a microsecond to several microseconds in length. Alternatively, the desired control pulses can be generated in any of the numerous other ways well-known to those skilled in the art as, for example, by use of a suitably proportioned "multivibrator" circuit.

The pulses from generator 12 are delayed a few microseconds, for example, 2 to 10 microseconds, by delay unit 11 which is adjustable and the purpose of which will be explained hereinafter. The pulses from unit 11 are amplified in amplifier 14, the output of which energizes transmitter 16 to emit similar ultra-high frequency radio pulses which energize the radiating elements 20 of the antenna system.

The antenna system can be, for example, of the general type described and illustrated in application Serial No. 453,390 of W. H. C. Higgins and C. A. Warren, filed August 3, 1942, which issued August 5, 1947 as Patent No. 2,424,982, which comprises a symmetrical linear array of dipole antennas placed end to end along the focal line of a paraboloidal sheet reflecting member 22. Reflector 22 should be of sufficient depth and curvature to provide a directive beam which is sharp, or narrow, in the vertical direction.

"Lobe switching" in the horizontal plane of the dipole array is provided by unit 18, the general arrangement being, for example, that illustrated in Fig. 11 of the above-mentioned application of Higgins and Warren and described in that application, though for the purposes of this invention a small number of dipoles on each side of the axis of symmetry can be employed. The lobe and scope switching mechanism 18 also includes a simple single circuit switch (scope switch) which is operated, by the shaft, the rotation of which effects the lobe switching action, to close while the mechanism deflects the antenna lobe in one direction and to open while the antenna lobe is deflected in the opposite direction. This switch can conveniently be, for example, of the "commutator, wiper-spring" type shown in Patent 2,143,035, issued January 10, 1939, to E. W. Smith (see items 18 to 22, inclusive, of the drawing of Smith's patent), or it can be a cam-operated switch of any of the numerous types well-known in the art. The purpose of this switch will become apparent in connection with the description of the amplifier of Fig. 3, hereinafter. In general, the lobe position is switched or moved approximately the width of the lobe in the signal system.

The antenna system including reflector 22 is tilted vertically about pivot 24, by crank 31 in the shaft 29 of motor 30 and connecting rod 33, to cause the antenna system to oscillate regularly through a small arc, for example, 16 degrees, in the vertical plane as motor 30 turns. The upper end of shaft 29 drives the lobe and scope switching mechanism 18 mentioned above, the entire mechanical linkage just described being proportioned so that the antenna system moves from its lowest to its highest tilt angle, while the lobe is switched in one direction, and from its highest to its lowest tilt angle, while the lobe is switched in the other direction. The purpose of the overall antenna scanning and lobe switching arrangements will also become apparent hereinafter. It may be stated briefly here that the arrangement is employed as part of means for providing substantially simultaneously, for both left and right lobe positions, range versus elevation patterns, which, as will presently appear, can be placed on opposite sides of the vertical center-line of the indicator screen to facilitate following a particular selected target in range, train (or azimuth) and elevation, simultaneously.

Echoes, or reflections, of the radiated pulses from objects within the area scanned by the radiated energy are received by the antenna system and pass through the TR box 32, the converter 35, the intermediate frequency amplifier 34 and the detector and video frequency amplifier 36 and are then applied to control element or anode 40 of cathode ray indicator 38 so that the intensity of the ray of the indicator will be increased each time a reflected pulse is received. The TR box is a resonant cavity tuned to the transmitted radio frequency and having shunted across a major potential gradient thereof a gas tube which breaks down when subjected to the high energy transmitted pulses, thus detuning the cavity and protecting the receiving circuits from damage or blocking by overloading. At the end of each transmitted pulse the gas tube recovers substantially instantaneously so that reflected pulses will freely enter the receiving apparatus.

The lower end of shaft 29 of motor 30 drives insulating arm 25 carrying contactors 27 of circular potentiometer 28, across the winding of which is connected a potential source or battery 26, as shown. The variable voltage of the potentiometer is connected across the vertical deflecting plates 44 of oscilloscope 38, as shown in Fig. 1, and serves to deflect the ray of the oscilloscope vertically in synchronism with the vertical tilting motion of the antenna system (i. e., the ray sweeps from its extreme lower position to its extreme upper position as the antenna is tilted through its corresponding range of motion, etc.).

The entire antenna system, with associated controls 15, is provided with means for turning it in azimuth and in elevation. This means can be, for example, similar to that shown in Fig. 5 of United States Patent 2,231,929, issued February 18, 1941, to J. Lyman, employed for like purposes. In Fig. 1 of the accompanying drawings, scales 61 and 63 are associated with controls 60 and 62, respectively, as shown, from index marks 66 and 65, of which the elevation and azimuth angles of system 15 can be read directly.

Range sweep generator 48 preferably provides conventional linear saw-tooth voltage sweep waves of either of two lengths, the longer one to cover the full useful range of the radar system and the shorter one to provide an expanded or precision range over a portion, for example, a 10-microsecond interval, of the full range. The range sweep is amplified in a special form of sweep amplifier 46, described in detail hereinafter, and then applied to the horizontal deflecting plates 42 of oscilloscope 38.

The range sweep desired is selected by moving sweep selector switch 74 to its "main" or "precision" position. The full or main sweep is synchronized with the outgoing radar pulses by energy pulses derived from pulse generator 12 through unit 11 over circuit 13 and the precision range sweep is synchronized by energy pulses over circuit 73, which, though also derived from generator 12, pass through adjustable delay units 54 and 50 before reaching swep generator 48.

When using the precision sweep, it has been found to be convenient to proportion the relative delays through the several portions of the system so that the range mark will normally occur at the center point of the sweep with unit 50 set to zero delay and also so that a reflected echo from an object at substantially zero range will occur at the same point as the range mark when adjustable delay units 54 and 50 are both set to zero delay.

Assuming, as above suggested, a precision sweep of 10 microseconds, it is obvious that the range mark should, preferably occur 5 microseconds after the start of the precision sweep. As above mentioned, the pulse controlling the precsion sweep originates in pulse generator 12 and passes through units 54, 50, and the range sweep generator 48, before reaching range sweep amplifier 46. Also, the pulse controlling the range mark originates in pulse generator 12 and passes through units 54 and 51 before reaching range mark generator 52. From this it is apparent that adjustable delay unit 51 should be adjusted so that its own delay and that of the range mark generator 52 should exceed the delay of units 50, 48, and amplifier 46, by precisely 5 microseconds.

Furthermore, it is apparent that, in order that a reflected pulse from an object at substantially zero range arrive at oscilloscope 38 at the same instant as the range mark, the total delay of a pulse in passing through units 11, 14, 16 and 18 to antenna 20 and by reflection back through units 20, 18, 32, 35, 34, and 36, must just equal the delay of a pulse passing through the above-traced circuit, including units 54, 51, and 52. Delay unit 11 is, therefore, adjusted to establish the desired condition.

Unit 50 provides convenient means, when using the 10-microsecond precision sweep, for bringing the left and right range lines, after alignment with the selected target, into closer proximity to facilitate the comparison of the amplitudes of left and right lobe reflections from the selected target, as will be described in connection with Fig. 2.

The arrangement of units 48, 50, 51, 52, and 54, as above described in detail, provides a convenient arrangement, in that the expanded section of the sweep can be definitely related to the range at which adjustable unit 54 is set, since with unit 50 adjusted to zero delay, the range marks from generator 52 are adjusted to occur in the center of the precision sweep for any setting of unit 54.

The selected range sweep is, as mentioned above, amplified in amplifier 46. The output circuit of this amplifier is balanced and is adjusted so that the cathode ray of oscilloscope 38 will start from the vertical double center line 230 (Fig. 2) inscribed on the oscilloscope screen.

The two lines of "double line" 230 are closely spaced. A single line could obviously be employed to indicate the center of the screen, but use of the double line, as shown, avoids possible confusion (or overlapping) of the right and left indicator patterns, as will be more readily understood in connection with the description hereinunder of a suitable form of the sweep amplifier 46, shown in Fig. 3. The beam of the oscilloscope will be deflected, by the range sweep, to the left or to the right, depending upon whether the antenna lobe is in its left or right position, respectively. This is controlled by the single circuit switch in the lobe and scope switching mechanism 18, mentioned above, and a relay or solenoid operated switch in amplifier 46 controlled by the first stated switch, a suitable voltage source being, of course, included in the circuit to operate the relay when required. A preferred form of the amplifier 46 is, as above-mentioned, shown in Fig. 3 in electrical schematic diagram form and will be described in detail hereinafter.

Pulses from generator 12 are also impressed upon range mark generator 52 after passing through adjustable delay units 51 and 54. Unit 54 is provided with an adjusting knob and pointer 53 and a scale 55 calibrated in yards or other convenient units of range. Unit 51, as stated above, provides for the initial adjustment of the "zero" position of the range marks to coincide with the center point of the precision sweep when unit 50 is set at zero. The range marks from unit 52 are applied to the control anode 40 of oscilloscope 38 and provide right and left range marks which take the form of vertical lines and can be aligned with the right and left reflections or echoes from a target of particular interest by adjustment of unit 54.

Range adjustments are usually made with reference to the "leading" or front edge of the reflected pulse, for example, the edge nearer the center lines 230 of oscilloscope screen 200, as shown in Fig. 2, since this is normally a well-defined point and the process, therefore, facilitates adjustment. When so adjusted, the range of the object from which the selected reflection is received can be read directly from the scale 55.

Adjustment of unit 50 when using the precision sweep can, as mentioned above, be employed to bring both the left and right range marks aligned therewith and the target indications nearer to the vertical center lines 230 of the oscilloscope screen 204 of Fig. 2, and thus facilitate the comparison of the amplitudes of the left and right lobe indications of a given target to determine the precise adjustment of az'muth control 62 required to align the axis of the antenna in azimuth with the target. The azimuth of the target can be read on scale 63 when the right and left indications from a selected object are of equal amplitude.

A preferred type of indication provided by systems of the invention, such as that illustrated in Fig. 1, is illustrated in detail in Fig. 2, where double line 230, as mentioned above, represents the vertical center of the oscilloscope screen 200 and elevation line 240 is the horizontal center line thereof. Elevation line 240 corresponds, as mentioned above, to the mid-position of the tilting movement imparted to the antenna reflector 22 by the crank and rod mechanism 31, 33 of Fig. 1. The elevation of a selected target can be read from scale 61 when control 60 has been adjusted so that line 240 bisects the reflected indication received therefrom.

Indications obtained with the antenna lobe in its left position are shown to the left of double line 230. Those with the lobe in its right position are shown to the right of double line 230. It is assumed, for purposes of explanation, that the system is being used on a marine surface craft and that two low-flying aircraft are within the area in range, elevation and azimuth at the moment covered by the radar system.

For the left lobe pattern, these two aircraft are represented by indications 210 and 218, respectively. Indications 212 and 220 are the "reflections" in the water of these two aircraft, for sponds, as mentioned above, to the midposition The elevation angles of these targets with respect to the elevation line 240 (or the center of the tilt range) are indicated by their respective vertical positions on the screen, object 218 being centered with respect to the elevation line 240 and object 210 being about 6 degrees above the elevation line, assuming, as indicated, a total tilt of 16 degrees, namely, 8 degrees above and 8 degrees below the elevation line. The relative ranges of the objects 210 and 218 are represented by their respective relative horizontal displacements to the left from the vertical center line 230 for the left half of the indicator pattern. The range is, of course, accurately determined for any selected reflection by adjusting unit 54 to bring the vertical range line 202 into coincidence with the "leading" edge of the selected reflection and reading scale 55, as previously described.

On the right half of the indicator screen a substantially identical pair of indications 214 and 206, with their reflections in the water 216 and 208, respectively, are obtained, except that their respective relative ranges are indicated by displacement to the right of center line 230 and their relative amplitudes with respect to corresponding indications on the left half of the pattern will differ if the amplitude of reflections received when using the right antenna lobe are different from the amplitude of reflections received when using the left lobe.

In the illustrative over-all pattern of Fig. 2, the "right lobe" indication 214 is shown as being of substantially identical amplitude with the corresponding left lobe indication 218, indicating that the antenna system has been adjusted properly in azimuth to give the true azimuth bearing of the object from which these reflections are being received. Indications 214 and 218 are furthermore centered vertically with respect to the elevation line 240, indicating that the antenna system has been adjusted properly in elevation to the true elevation angle of the object from which these reflections are being received. Accordingly, the azimuth and elevation angles of this particular object can be read from scales 63 and 61, respectively, of Fig. 1, as described above.

The range marks which form the dotted lines 202 have been adjusted by unit 54 to coincide with the leading or nearer edges of indications 214 and 218 and hence the range of the object may be read directly from the calibrated range scale 55 on unit 54.

It should be noted that, when using the precision sweep, all indications, including both of the indications 214, 218, and the range lines 202, can be brought closer to the vertical center line 230 by adjustment of unit 50, the operator bringing them sufficiently close together so that it can be easily judged when they are of identical brightness and size. This adjustment does not affect the actual range of the object but merely shifts the entire range scale on each half of the indicator pattern to facilitate the matching of a particular chosen pair of left and right lobe indications as described.

Considering the right lobe indication 206, its amplitude is apparently greater than that of its corresponding left lobe indication 210 as evidenced by its greater brightness (the degree of brightness is indicated by the weight of the lines) and somewhat larger size. This indicates, of course, that the antenna system should be turned to the left if it is desired to determine the precise azimuth of the object from which indications 208, 210 are received. As these indications are above the elevation line 240, it is further obvious that the elevation of the antenna system should be increased until the elevation line 240 bisects indications 208, 210 if the precise elevation of the object is to be obtained. Likewise, to facilitate amplitude comparison, unit 50 should be adjusted to bring the two indications 208, and 210 into closer proximity and unit 54 should be adjusted to bring the lines of range marks 202 into coincidence with the leading edges of indications 208, 210 to obtain the range. When the above indicated adjustments have been made, indications 208, 210 will have been brought into substantially the positions occupied in Fig. 2 by indications 214, 218 and the azimuth, elevation, and range of the second object may then be read from scales 63, 61, and 55, of Fig. 1, respectively.

An alternative type of indication which could be employed with systems of the invention, is that in which the left lobe pattern of indications is superimposed upon the right lobe pattern of indications but displaced by a small arbitrary interval to the right. To provide such an indication the direction of the range sweep would be the same for each pattern but the starting line for the two patterns would, of course, be displaced by the aforementioned slight interval. With such a composite indication, each right lobe target indication would have the corresponding left lobe target indication beside it and it would not be necessary to manipulate an apparatus unit to bring them close together for the purpose of amplitude comparison. Such an arrangement would, however, in some cases, involve a sacrifice of the ease with which corresponding left and right lobe indications of a particular target could be identified. The general method is, of course, an extension of that of matching left and right lobe indications from a single target, other indications being excluded by "gating" the receiver. This latter method, employed in numerous prior art object detecting systems, is described for example in the above-mentioned application of Higgins and Warren.

It is apparent from the above description that where the three alignment processes necessary, i. e., alignment in azimuth, elevation and range, have been assigned to three separate operators, respectively, all three operators may cooperate and manipulate the several controls simultaneously to bring a particular pair of indications into the desired alignment. Obviously, this cooperative effort can, furthermore, be continuously applied in order to follow the movement of a rapidly moving target such as an aircraft.

Data transmitting systems can also readily be devised by those skilled in the art to be mechanically connected to the shafts of the three adjustment controls to forward train (or azimuth), elevation and range data to a gun director or fire control station. Such arrangements are well known in the art, one form being described, for example, in the above-mentioned patent to Lyman. Also, antiaircraft guns can be arranged to follow the movements of the antenna, with appropriate corrections by auxiliary controls for target speed, range and windage, and the firing of the guns can be controlled by an officer who has before him a duplicating indicator showing when the radar is being maintained precisely in alignment with the target.

Also, separate duplicate oscilloscopes can be provided for each radar operator so that they may more conveniently perform their several functions. Moreover, aided drives to facilitate the tracking of rapidly moving targets or fully automatic tracking arrangements, well known in the art, can be provided and given partial or full control of the radar system and associated gun directors, once a definite target has been selected and the radar system aligned thereon.

In Fig. 3, a suitable type of range sweep amplifier, for use as amplifier 46 in the system of Fig. 1, is shown in schematic diagram form. This amplifier is described in detail in the copending application of E. A. Krauth, Serial No. 568,989, filed December 20, 1944, assigned to applicant's assignee, and the novel features thereof are claimed in the Krauth application.

A saw-tooth sweep wave voltage, such as that indicated by wave 360 for the main or full range sweep, or by a "shorter" wave 370 for the precision sweep, is impressed upon terminal 302 by range sweep generator 48 of Fig. 1, according to the position of sweep selector switch 74.

The precision sweep differs from the main sweep only in having a steeper slope and consequently shorter duration which, of course, means that the ray of the oscilloscope will traverse the screen more rapidly and thus, in effect, expand a portion of the main sweep to provide increased precision in range observations within the expanded portion.

In Fig. 3, a double-pole, double-throw switch 306 is mechanically coupled to an electromagnetic device 312, such, for example, as a solenoid, having an armature 311, which is operated by energy from a battery 316, when terminals 332 are short-circuited by the closing of the single circuit switch mentioned above (in the lobe and scope switching mechanism 18 of Fig. 1) to which they are connected when the amplifier is assembled in the system. The operation of the device 312 occurs, for example, when the antenna lobe has been switched to its right-hand position and causes the switch 306 to be thrown to its lower or "right" position against the tension of a retractile spring 308 anchored to a point 310 of the chassis of the amplifier. When the antenna lobe is switched to its left-hand position the terminals 332 are open-circuited, device 312 is released and spring 308 contracts, throwing switch 306 to its upper or "left" position.

The amplifier of Fig. 3 is of the phase-inverter, cathode coupled type, known to those skilled in the art, which provides a "balanced" output but operates from an unbalanced input. The positive terminals of 300-volt direct current potential sources, not shown, but which can be simple batteries or suitable rectifiers operating from alternating current supplies, are connected to terminals 318, 320 and 324, as indicated and the positive terminal of a 450-volt direct current source, not shown, is connected to terminal 322, as indicated, of the amplifier, for normal operation, the negative terminals of all said sources being grounded. Alternatively, a unitary potential source providing +300 volts and +450 volts direct current, its negative terminal being grounded, can be employed and suitable isolating impedances employed in the several circuits just mentioned, in accordance with principles well known to those skilled in the art.

With switch 306 in its upper position, potentiometer 304 provides a convenient means for adjusting the potential of the control grid (the grid immediately adjacent the cathode) of pentode vacuum tube 338. Similarly, with switch 306 in its lower position, potentiometer 314 provides means for adjusting the potential of the control grid of pentode vacuum tube 342. The second or middle grids of both of these pentodes are connected together and through resistor 334 to the positive 300-volt supply normally connected to terminal 324. The third grids (immediately adjacent the anodes) of both pentodes are connected to their respective cathodes, which latter are connected together and through resistor 336 to ground. The anodes of pentodes 338 and 342 connect directly to output terminals 326 and 330, respectively, and through load resistors 346 and 350, respectively, to terminal 322 which is normally maintained at 450 volts (positive) with respect to ground. A voltage divider comprising resistors 352 and 354 maintains terminal 328 at a potential midway between the potentials at terminals 326 and 330.

In the usual terms employed in the art, with switch 306 in its upper or left position, the circuit including vacuum tube 342 is a single stage amplifier and the circuit including vacuum tube 338 is a phase inverter stage coupled to the amplifier stage through the cathode resistor 336, common to these two circuits. This arrangement provides a balanced or "push-pull" output which is particularly desirable for the present purposes since it is a convenient way to obtain sweep voltages of the desired magnitude. Furthermore, as is well known to those skilled in the art, the balanced nature of the output maintains good focus of the oscilloscope ray over the entire screen. The phase inverter stage is provided with an independent adjustable direct current biasing circuit for its control grid (i. e., the grid nearest the cathode). This biasing circuit comprises potentiometer 304, the ungrounded terminal 320 of which is connected to the positive terminal of a 300-volt direct current source, as previously mentioned.

This use of an adjustable independent bias facilitates the adjustment of the balance of the amplifier and further contributes towards the ease with which a reversal of the polarity or "direction" of the amplified sweep wave appearing across terminals 326 and 330 can be effected, since by simply operating the solenoid 312 (by the short-circuiting of the terminals 332 as described above) to throw switch 306 to its lower (or right) position it is at once evident that the circuit including vacuum tube 338 now becomes the amplifier stage and the circuit including vacuum tube 342 becomes the phase inverter stage. The control grid of this latter stage now derives its bias from potentiometer 314 the ungrounded terminal 318 of which is connected to the positive terminal of a 300-volt direct current supply source, as mentioned above. The desired reversal of polarity at terminals 326, 330 is thereby accomplished.

The use of a double vertical center line between the two images on the screen of an associated oscilloscope, or equivalent indicating device, such as the double line 230 of Fig. 2, in combination with the flexibility of adjustment afforded by the provision of an independent adjustable bias on the control grid of either tube 338 or 342, when acting as the phase inverter, facilitates adjustment of the horizontal left and right sweeps to zero since each can then be made to coincide with the nearer one of the lines 230. If a single line were employed it would be somewhat more difficult to determine when both the right and left horizontal sweep lines had been adjusted to precisely coincide with their respective zero lines without overlapping the other image. Also deviation from the zero lines during normal operation of the system is more readily detected if two separated zero lines are employed.

In passing it should be noted that the insertion of a polarity reversing switch at terminals 326, 330 is not practicable, nor desirable, because of the high potentials and high impedance levels involved at this point in the circuit.

The operation of the reversible balanced sweep amplifier of Fig. 3 is illustrated by the voltage waves shown in Figs. 4 and 5.

Fig. 4 illustrates the approximate voltage relations existing at the control grids, plates (anodes), and in the grid-cathodes circuits ($E_{gk}$) of the pentodes 338 and 342 of the amplifier of Fig. 3 when switch 306 is in the lower or right (R) position. The straight horizontal lines at the left of Fig. 4 show these voltage relations when no sweep impulses are being furnished to terminal 302 of Fig. 3.

Lines 400 and 401 represent the potentials of the anodes of tubes 342 and 338, respectively. Lines 410 and 412 represent the potentials of the control grids of tubes 342 and 338, respectively. Lines 420 and 422 represent the potentials developed in the grid cathode circuits of tubes 342 and 338, respectively.

When the sweep is on and sweep pulses, such as 360 or 370, are being furnished to terminal 302, Fig. 3, the voltage relations shown at the right of Fig. 4 obtain.

The anode of tube 342 has its interpulse value of +300 volts, line 400, and rises linearly to a maximum approaching +450 volts, line 402, returning more rapidly, line 406, to +300 volts, while the anode of tube 338 has an interpulse value of +296 volts, line 401 which decreases linearly to a minimum approaching +150 volts, line 404, returning more rapidly, line 408, to +296 volts so that the average potential of the anodes of tubes 342 and 338 remains constantly +298 volts. This is, of course, the recognized optimum condition for maintaining a good focus of the beam of the associated cathode ray oscilloscope, throughout the entire sweep of the ray in response to the deflecting voltages.

The grid voltage variation of tube 338 is represented by lines 412, 414 and 416 for the above-described variation cycle, the grid of tube 342 remaining constant, line 410.

The grid-cathode circuit voltage cycles for tubes 342 and 348 are represented by lines 420, 428 and 430 and lines 422, 424, and 426, respectively, for the above-described variation cycle of anode potentials.

In Fig. 5 the voltages and their variation cycles are represented for the upper (or left) position of the switch 306. From inspection it is obvious that they are identical but interchanged with respect to the two tubes 342 and 338 so that the output voltages appearing between terminals 326 and 328 and between 330 and 328 are merely interchanged. In other words, for the "no sweep" condition illustrated at the left in Fig. 5, the anode potential of tube 338 is now +300 volts, line 511, while that of the anode of tube 342 is +296 volts, line 513. The control grid voltage of tube 342 is +30.0 volts, line 512, and that of tube 338 is +29.8 volts, line 514. The grid-cathode circuit voltage of tube 342 is −1.8 volts, line 518, and that of tube 338 is −2.0 volts, line 520.

For the "sweep on" condition illustrated to the right of Fig. 5, the anode voltage of tube 338 follows lines 500, 504 and 506 and that of tube 342 follows lines 502, 508 and 510. The control grid of tube 342 follows lines 512, 522 and 524 while that of tube 338 is constant +29.8 volts, line 514. The grid-cathode circuit voltage of tube 342 follows lines 518, 522 and 524 while that of tube 338 follows lines 520, 528 and 532, as shown in Fig. 5. It is thus apparent that a right or left deflection of the ray of the oscilloscope from a position near the center of the screen can be obtained by the arrangement of Fig. 3, the direction of sweep being determined by the position of switch 306. It should be noted as a desirable condition that the average of the anode (or plate) voltages of the two vacuum tubes should be substantially the same for both left and right sweeps as exemplified in Figs. 4 and 5 where the average for both figures is +298 volts.

Numerous other arrangements within the spirit and scope of the invention will occur to those skilled in the art. The scope of the invention is defined in the following claims.

What is claimed is:

1. In a pulse-reflection radar system for marine vessels and coastal defense use, an antenna system capable of emitting a pulsed beam of radio energy, said beam being of narrow angular spread in the vertical plane, a scanning mechanism for turning said antenna rapidly back and forth through an appreciable vertical angle, a lobe switching mechanism for regularly switching the antenna lobe or beam a few degrees in the horizontal plane from a right position to a left position, a mechanism for coordinating the lobe switching action of said last-stated mechanism with the vertical scanning mechanism to cover one full vertical sweeping motion for each successive lobe position, an indicating system including an indicator having a screen and a movable marking element, means for deflecting said marking element vertically in synchronism with the vertical motion of said antenna system, means for deflecting said marking element horizontally from the vertical center of said screen, to the right when said antenna beam is in the right position and to the left when said antenna beam is in the left position, in synchronism with the emission of exploratory pulses by the radar system and means for actuating said marking element to produce indications at the precise instants at which reflected energy is received by said antenna system whereby, when a number of reflecting objects are within the area scanned by the antenna beam, there will appear upon the right and left sides of said indicator screen, patterns of indications the vertical positions of which indicate the vertical angles of the respective reflecting objects and the horizontal distances of said indications from the vertical center of said screen represent the relative ranges or distances to the respective reflecting objects from the radar system, the right side pattern representing the reflections received with the antenna lobe in its right position, the left side pattern representing the reflections received with the antenna lobe in its left position and the matching of the amplitude of a right side indication with that of its corresponding left side indication can be employed to indicate that the azimuth of that particular reflecting object from which said indications are received is that of the antenna axis, centrally located between the right and left antenna lobe positions.

2. In a direction and range determining system of the type in which a pulsed beam of exploratory energy is radiated by a highly directive emitting device and reflections thereof are received and timed to determine the range or distance of objects from which reflected pulses are received, the combination which comprises a first means for repeatedly sweeping an arc in a first plane with said emitting device, a second means for abruptly altering the directivity of said emitting device between two positions approximately the width of the beam apart in a second plane substantially at right angles to said first plane, the periodicity of said second means being that of said first means, and a third means for simultaneously presenting, in juxtaposition on a common indicator, two independent patterns of indications on separate portions of the screen of said indicator showing angular direction in said first plane versus relative range for each reflecting object, range being indicated for each indication by the distance of the indications from the proximate borders of said respective separate portions, direction in said first plane being indicated for each indication by the transverse position of the indication, one pattern relating to one beam position in said second plane the other relating to the other beam position in said second plane, direction in said second plane being indicated by the relative intensities of corresponding indications of said two patterns, said third means comprising a cathode ray oscilloscope cooperatively connected with a range sweep generator, a reversible range sweep amplifier, sources of voltage controlled by said first and said second means to control the sweeping action of the ray of said oscilloscope and a radio receiver responsive to echos of said emitted pulsed beam to intensity modulate the ray of said oscilloscope whenever an echo is received, whereby directivity in each of said two planes and the relative ranges of all the objects from which reflections are received can be simultaneously represented.

3. The arrangement defined in claim 2 the said two patterns of indications having a substantially common boundary along which angular direction in the said first plane is represented and a fourth means comprising an adjustable delay unit cooperatively associated with the range sweep generator, for adjusting the effective range scales of both patterns to bring any selected indication in one pattern and its corresponding indication in the other pattern into close proximity with respect to each other near said common boundary whereby the relative amplitudes of said selected indications can be more readily compared.

4. In an object locating system, means for emitting a highly directive pulsed energy beam, means for receiving reflections of said energy beam and determining the distance of objects from which reflections are received, means for rapidly sweeping said beam repeatedly through an arc in one plane, means for switching the beam repeatedly between two closely adjacent positions in a second plane at right angles to said first plane after each sweep of said beam through said arc and means for presenting in juxtaposition on a common indicator two independent patterns of indications on separate portions of the screen of said indicator showing elevation and range of all objects from which reflections are received, one pattern corresponding to reflections received with the beam in one position and the other corresponding to reflections received with the beam in the other of said two closely adjacent positions range being indicated for each indication by the distance of the indication from the proximate borders of said respective separate portions, direction in said first plane being indicated for each indication by the transverse position of the indication, direction in said second plane being indicated by the relative intensities of corresponding indications of said two patterns, said last stated means comprising a cathode ray oscilloscope cooperatively connected with a range sweep generator, a reversible range sweep amplifier, sources of voltage controlled by said antenna sweeping and said antenna beam switching means to control the sweeping action of the ray of said oscilloscope and said receiving means being cooperatively connected to intensity modulate the ray of said oscilloscope whenever an echo of said pulsed energy beam is received, whereby information concerning the range and the angular directivity in both said planes of all objects from which reflections are received, is presented simultaneously.

WILLIAM H. DOHERTY.

REFERENCES CITED

The following references are of record in the file of this patent:

UNITED STATES PATENTS

| Number | Name | Date |
| --- | --- | --- |
| 2,189,549 | Hershberger | Feb. 6, 1940 |
| 2,405,930 | Goldberg | Aug. 13, 1946 |
| 2,412,703 | Wolff (1) | Dec. 17, 1946 |
| 2,415,566 | Rhea | Feb. 11, 1947 |
| 2,415,981 | Wolff (2) | Feb. 18, 1947 |
| 2,418,143 | Stodola | Apr. 1, 1947 |
| 2,419,567 | Labin | Apr. 29, 1947 |

FOREIGN PATENTS

| Number | Country | Date |
| --- | --- | --- |
| 552,072 | Great Britain | Mar. 22, 1943 |
| 497,147 | Great Britain | Dec. 9, 1938 |